United States Patent [19]
Baber et al.

[11] Patent Number: 5,323,314
[45] Date of Patent: Jun. 21, 1994

[54] METHOD AND SYSTEM FOR GRAPHIC REPRESENTATION OF MEETING PARAMETERS IN A DATA PROCESSING SYSTEM

[75] Inventors: Ron L. Baber, Bedford; John G. Innes, Arlington; J. Michael Pringle, Grapevine, all of Tex.

[73] Assignee: International Business Machines Corporation, Armonk, N.Y.

[21] Appl. No.: 815,666

[22] Filed: Dec. 31, 1991

[51] Int. Cl.5 .................................................. G06F 15/40
[52] U.S. Cl. .................................... 364/401; 395/155; 395/159; 345/163
[58] Field of Search ...................... 3645/401, 468, 407, 3645/705.08; 395/100, 118, 155, 161, 159; 340/706

[56] References Cited

U.S. PATENT DOCUMENTS

| | | | |
|---|---|---|---|
| 4,866,611 | 9/1908 | Cree et al. | 364/300 |
| 4,881,179 | 11/1989 | Vincent | 364/518 |
| 4,977,520 | 11/1990 | McGaughey, III | 364/521 |
| 5,023,851 | 6/1991 | Murray et al. | 368/41 |
| 5,050,077 | 9/1991 | Vincent | 364/401 |
| 5,093,813 | 3/1992 | Levine | 368/10 |
| 5,124,912 | 6/1992 | Hotaling et al. | 364/401 |
| 5,129,057 | 7/1992 | Strope et al. | 395/161 |
| 5,165,012 | 11/1992 | Crandall et al. | 395/100 |
| 5,195,086 | 3/1993 | Baumgartner | 370/62 |
| 5,197,000 | 3/1993 | Vincent | 364/401 |

Primary Examiner—Roy N. Envall, Jr.
Assistant Examiner—A. Bodendorf
Attorney, Agent, or Firm—Norman Gundel; Andrew J. Dillon

[57] ABSTRACT

A method and system for graphic representation of the availability of desired meeting attendees, meeting sites and elements of equipment for use in a data processing system having a display and a calendar database listing scheduled calendar events. A graphically distinctive object is associated with each desired meeting attendee, meeting site and/or element of equipment for use in a data processing system having a display and a calendar database listing scheduled calendar events. A graphically distinctive object is associated with each desired meeting attendee, meeting site and element of equipment. Thereafter scheduled calendar events for all desired meeting attendees, meeting sites and elements of equipment are examined within a selected time span and tiers of graphically distinctive objects are displayed, perpendicular to a time axis, at selected time points along that axis in response to the existence of each scheduled calendar event for a desired meeting attendee, meeting site and/or element of equipment. In alternate embodiments of the present invention, a graphically distinctive object is displayed at a selected time point along the time axis in response to either the presence or the absence of a scheduled calendar event at that time point. Additionally, a graphic depiction of an element of equipment may be utilized within a graphically distinctive object associated with that element of equipment, enabling a user to intuitively determine the availability of selected elements of equipment or desired meeting attendees.

14 Claims, 9 Drawing Sheets

METHOD AND SYSTEM FOR GRAPHIC REPRESENTATION OF MEETING PARAMETERS IN A DATA PROCESSING SYSTEM

BACKGROUND OF THE INVENTION

1. Technical Field

The present invention relates to data processing system based meeting scheduling systems, and in particular to a method and system for permitting a user to select alternate meeting parameters when all desired meeting parameters cannot be met. Still more particularly, the present invention relates to an intuitive and graphical method for displaying the availability of desired meeting attendees, meeting sites and elements of equipment in a data processing system.

2. Description of the Related Art

The scheduling of meetings has always been fraught with problems. This is particularly true in cases when the person scheduling the meeting has no management or other control over those whose attendance is either desired or necessary.

The prior art initially eased the scheduling burden in that keyboard/display terminal users' schedules were stored in varying calendar forms, and all could be available for call-up at each terminal. These schedules could be called and scanned to determine common available times. This was extremely time consuming as schedules were only available in narrative form on a day-at-a-time basis. Even when monthly abbreviated schedules or calendars were available for call-up, mental or pencil and paper notation of available times was both error-prone and no minor chore.

The prior art has now gone further in solving the above-noted problems. Calendar application programs, stored in a host computer to which the terminal users are connected, are able to read calendars of prospective attendees and provide a listing of available meeting times and dates. The available times and dates are derived from date and time ranges provided by a meeting scheduler. From this listing, a meeting scheduler may select a suitable time and date. After making a selection, either writing down or making a mental note of the suitable time and date, the meeting scheduler may key and transmit a message to each attendee. These systems still require excessive keying in terms of rekeying attendees' names, and a meeting time and date.

More recently, a technique has been developed which presents available meeting times and dates to a meeting scheduler as an option screen. The option screen is then keyed in order to select a time and date for the meeting. When utilizing this technique, a notification screen is presented to the scheduler after selection from the option screen. The scheduler then keys into the notification screen, filling in the purpose and location of the meeting and, if appropriate, shortening the duration of the meeting. Upon completing the notification screen, the screen is then transmitted to notify all attendees of the meeting. While this system represents an advance in time savings, error reduction, and reduced keying requirements, it does not address the problem which occurs when a meeting time cannot be determined which complies with all of the required parameters as determined by the meeting scheduler.

One attempt at solving this problem is described in U.S. Pat. No. 5,050,077, in which desired meeting times, dates and attendees are automatically altered or "relaxed" in order to achieve an acceptable meeting time. An option list of meeting times is then presented to the scheduler for selection of a meeting time. Based upon the selection of the scheduler of one of the optional lists of meeting times, a meeting notification screen is constructed for transmittal to each attendee. While this approach represents a substantial increase in efficiency over the prior art, the increased complexity in meeting scheduling systems makes the selection of a less than optimal meeting time difficult for a meeting scheduler.

Therefore, it should be apparent that a need exists for a method and system which presents an intuitive and graphic representation of meeting parameters within a data processing system such that a meeting scheduler may simply and easily select a less than optimal set of meeting parameters for a desired meeting.

SUMMARY OF THE INVENTION

It is therefore one object of the present invention to provide an improved data processing system based meeting scheduling system.

It is another object of the present invention to provide an improved method and system for permitting a user to select alternate meeting parameters when all meeting parameters cannot be met.

It is yet another object of the present invention to provide an intuitive and graphical method for displaying the availability of desired meeting attendees, meeting sites and elements of equipment in a data processing system implemented meeting scheduler.

The foregoing objects are achieved as is now described. The method and system of the present invention may be utilized to provide a graphic representation of the availability of desired meeting attendees, meeting sites and elements of equipment for use in a data processing system having a display and a calendar database listing scheduled calendar events. A graphically distinctive object is associated with each desired meeting attendee, meeting site and/or element of equipment. Thereafter scheduled calendar events for all desired meeting attendees, meeting sites and elements of equipment are examined within a selected time span and tiers of graphically distinctive objects are displayed, perpendicular to a time axis at selected time points along that axis, in response to the existence of each scheduled calendar event for a desired meeting attendee, meeting site and/or element of equipment. In alternate embodiments of the present invention, a graphically distinctive object is displayed at a selected time point along the time axis in response to either the presence or the absence of a scheduled calendar event at that time point. Additionally, a graphic depiction of an element of equipment may be utilized within a graphically distinctive object associated with that element of equipment, enabling a user to intuitively determine the availability of selected elements of equipment or desired meeting attendees.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
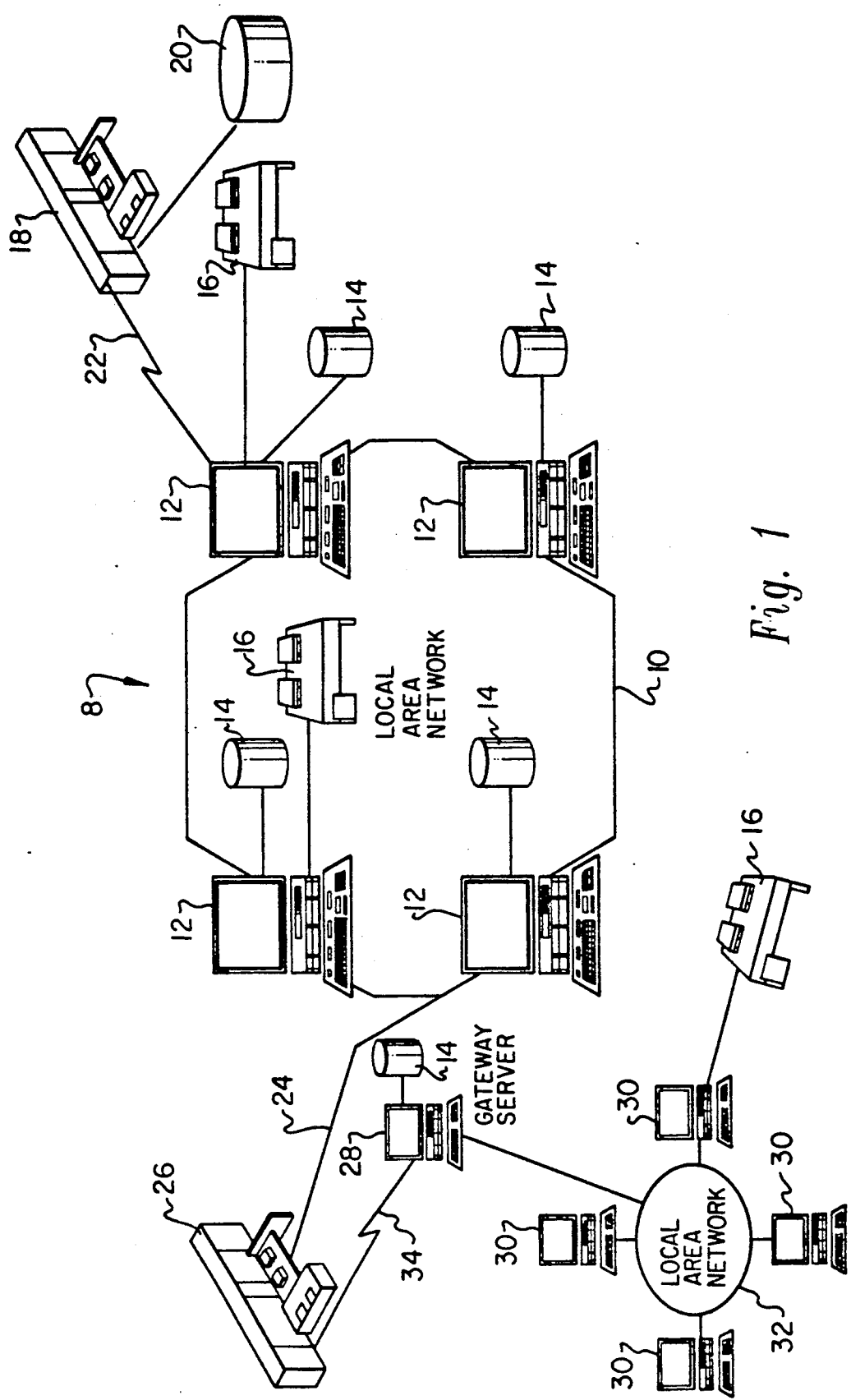
FIG. 1 is a pictorial representation of a distributed data processing system which may be utilized to implement the method and system of the present invention.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized to implement each such network.

As is common in such data processing systems, each individual computer may be coupled to a storage device 14 and/or a printer/output device 16. One or more such storage devices 14 may be utilized, in accordance with the method and system of the present invention, to store a calendar database listing scheduled calendar events for one or more users within data processing system 8. Further, one or more such storage devices 14 may be utilized, as will be explained in greater detail herein, to store a data processing program which may be utilized to implement the method and system of the present invention whereby an intuitive graphic representation of the availability of desired meeting attendees, meeting sites and/or elements of equipment may be provided.

Still referring to FIG. 1, it may be seen that distributed data processing system 8 may also include multiple mainframe computers, such as mainframe computer 18, which may be preferably coupled to Local Area Network (LAN) 10 by means of communication link 22. Mainframe computer 18 may be coupled to a storage device 20 which may serve as remote storage for a Local Area Network (LAN) 10 and may be coupled via communications controller 26 and communication link 34 through a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10 a calendar database listing scheduled calendar events for a plurality of prospective meeting attendees, meeting sites and/or elements of equipment may be stored within storage device 10 within data processing system 8 and controlled by mainframe computer 18.

Upon reference to the foregoing those skilled in the art will appreciate that the calendars of multiple enrolled users within data processing system 8 may be stored at some selected central point within data processing system 8 and accessed by various users within data processing system 8 in an attempt to schedule a meeting for a plurality of desired meeting attendees, at a desired meeting site and in conjunction with selected elements of equipment. Additionally, any computer within data processing system 8 may utilize its associated display to provide the intuitive graphic representation of the availability of desired attendees, desired meeting sites and/or desired elements of equipment in a manner which will be explained in greater detail herein.

Figure 2A:
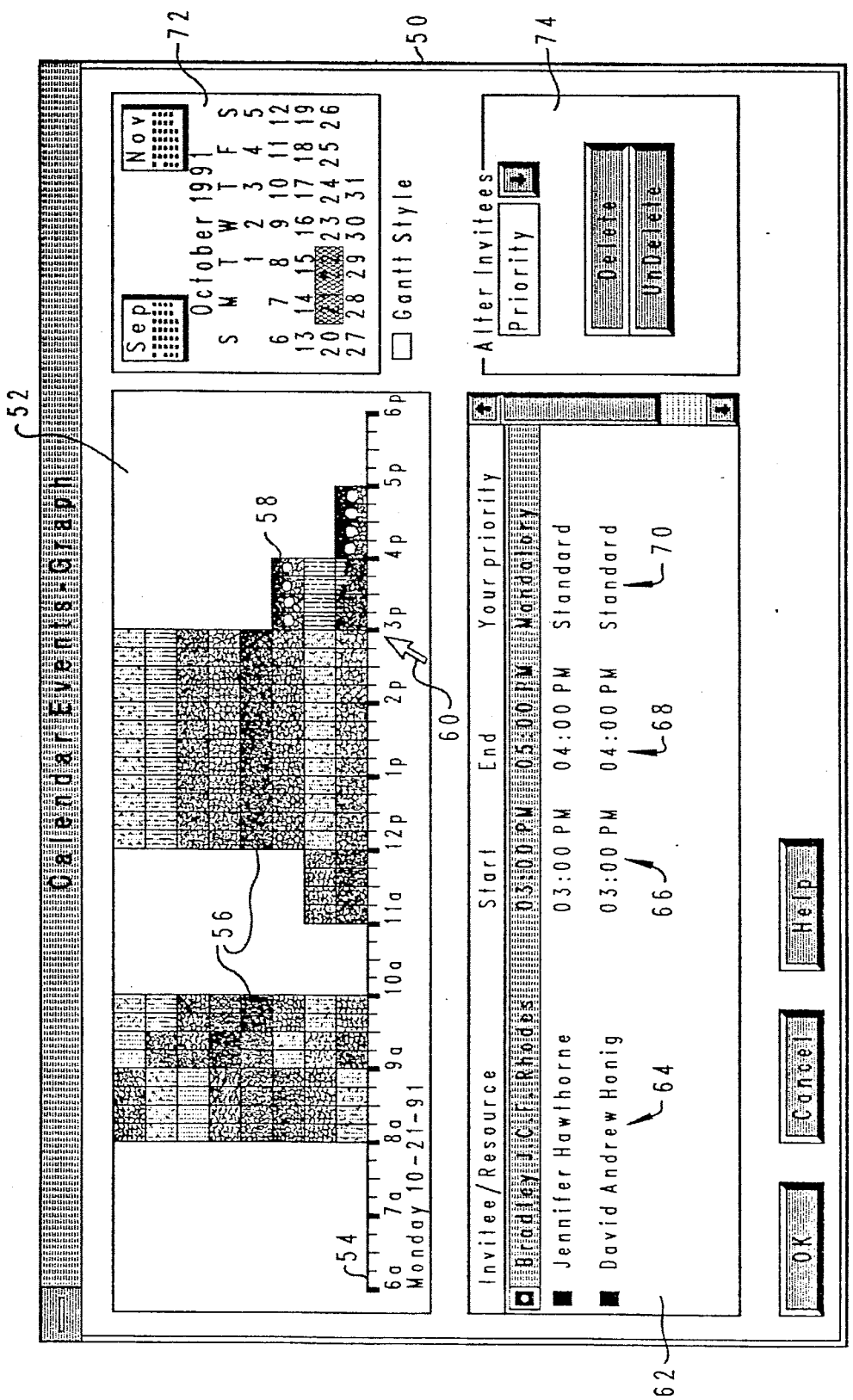
FIGS. 2a and 2b are pictorial representations of a computer display providing an intuitive graphic representation of the availability status of a plurality of desired meeting attendees and additional graphical data regarding those attendees in accordance with the method and system of the present invention.

Referring now to FIG. 2a, there is depicted a pictorial representation of a computer display providing an intuitive graphic representation of the availability status of a plurality of desired meeting attendees in accordance with the method and system of the present invention. As illustrated, a computer display 50 is provided utilizing a well known Graphical User Interface (GUI) technique. Various subwindows are also provided within computer display 50. For example, in accordance with the depicted embodiment of the present invention, availability window 52 is provided. Availability window 52 includes a time axis 54 which includes a plurality of time points disposed thereon. As depicted, a plurality of graphically distinctive objects 56 are arranged in tiers, perpendicular to time axis 54, each representing the existence of stored scheduled calendar events for each desired meeting attendee, meeting site or element of equipment.

Each graphically distinctive object 56 depicted within availability window 52 includes selected cross-hatching which is associated with a particular desired meeting attendee, meeting site or element of equipment. Of course, those skilled in the art will appreciate that the cross-hatching depicted within FIG. 2 may represent the provision of multiple colors in a color display system associated with a computer within data processing system 8. Additionally, as will explained in greater detail herein, each graphically distinctive object 56 depicted within a perpendicular tier disposed along time axis 54 may represent either the presence or absence of a scheduled calendar event in a manner which permits a user of the method and system of the present invention to intuitively and graphically select a proposed meeting time under the most optimal conditions possible.

In accordance with yet another aspect of the present invention, individual graphically distinctive objects 56 within availability window 52 may include a secondary graphic element indicating a desired priority for a particular desired meeting attendee, meeting site or element of equipment. As illustrated at reference numeral 58, a selected graphically distinctive object may include a small graphic element, such as a circle or star of contrasting color, indicating a mandatory priority selection for a desired meeting attendee, meeting site, or element of equipment associated with the particular graphically distinctive object thus depicted.

Thus, upon reference to availability window 52 those skilled in the art will appreciate that the display provided therein permits a user to graphically and intuitively determine those individuals, meeting sites or elements of equipment which are either available or not available during a particular time frame, by utilizing a display constructed in the manner depicted. Additionally, if a graphical pointing device, such as a mouse, is associated with a particular computer within data processing system 8, mouse pointer 60 may be utilized to invoke additional information regarding the graphic representation provided within availability window 52. For example, by positioning mouse pointer 60 at the 3:00 p.m. point along time axis 54 and "clicking" the mouse button, a textual display window 62 may be provided.

As illustrated within textual display window 62, additional textual information regarding the availability of desired attendees, meeting sites or elements of equipment at the 3:00 p.m. point along time axis 54 may be provided. As depicted, in a preferred embodiment of the present invention, textual display window 62 includes a column 64 which depicts the name of each individual whose availability at the 3:00 p.m. point along time axis 54 is contained by a scheduled calendar event, along with a graphic indication of the specific graphically distinctive object associated with that individual.

Additionally, at column 66 within textual display window 62, the start time for the particular calendar event which constitutes a conflict with the desired meeting parameters for each individual having a conflict at the 3:00 p.m. point along time axis 54 is depicted. Similarly, column 68 depicts a textual indication of the ending time for the conflict in question. Finally, column 70 may be utilized, in the depicted embodiment of the present invention, to textually indicate the selected priority for the particular attendee, meeting site or element of equipment, or to provide any other desired parameters concerning an attendee, meeting site or element of equipment.

Thus, it may be seen that attendee Rhodes has a conflict from 3:00 p.m. until 5:00 p.m. and that attendee Rhodes has been assigned a priority of "mandatory" for the meeting to be scheduled. Additionally, an "Alter Invitee's" window 74 is provided. Utilizing Graphical User Interface (GUI) techniques well known in the art a user may select a particular desired attendee from textual display window 62 and either alter the stated priority for that attendee, or delete or undelete that attendee from the desired meeting, by selecting one or more of the buttons depicted within "Alter Invitee's" window 74.

Finally, calendar window 72 may be utilized to graphically indicate that availability window 52 represents but one of several availability windows which have been constructed utilizing the method and system of the present invention, for multiple days within the month depicted within calendar window 72. It should therefore be apparent that while time axis 54 illustrates only those day time hours within a particular day (Monday, Oct. 21, 1991 in the depicted example) the method and system of the present invention may be utilized to construct an availability window for multiple days within a particular time span, should the meeting scheduler desire to schedule a meeting during a span of time which spans several days.

Figure 2B:
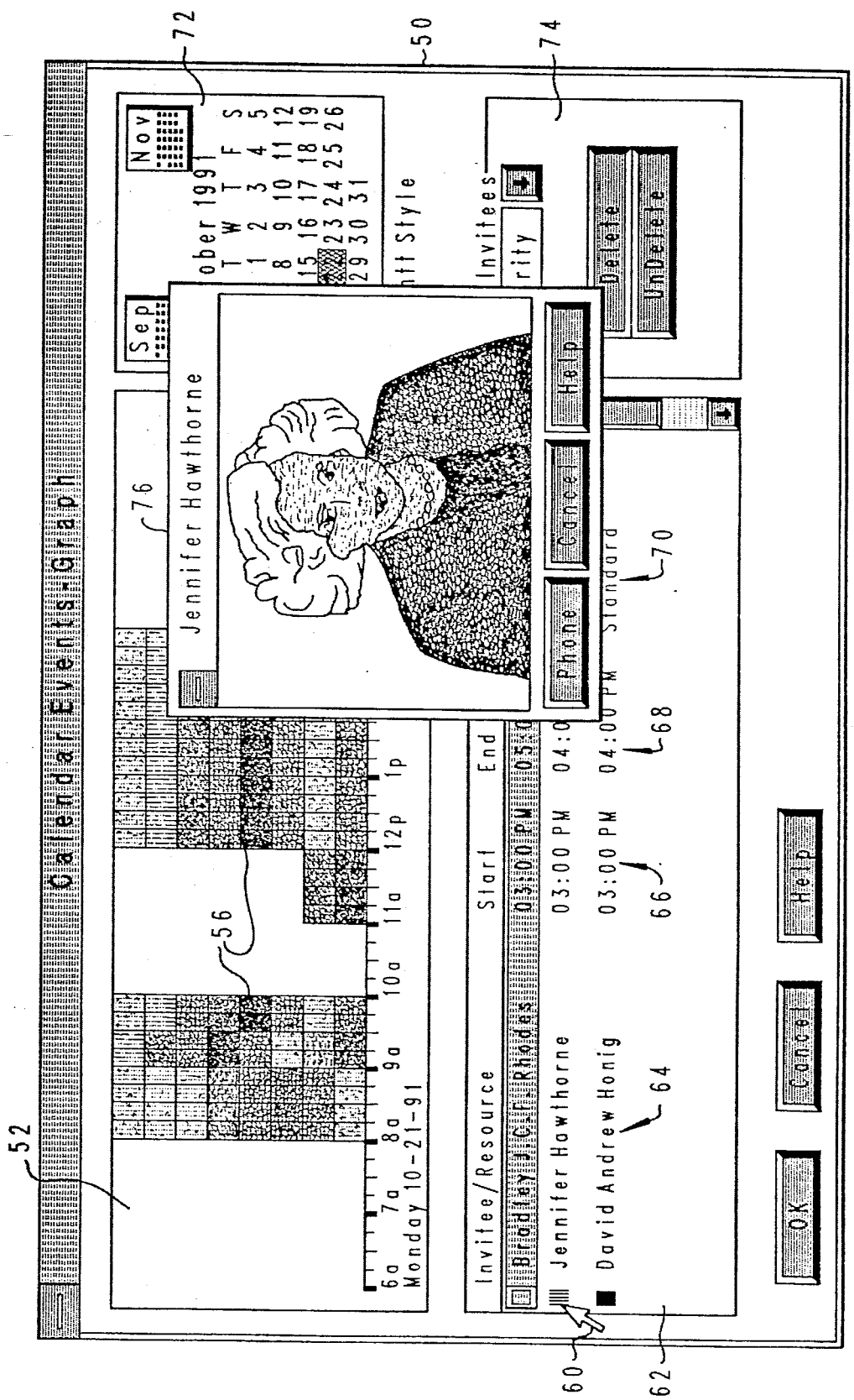

Referring now to FIG. 2b, there is depicted a pictorial representation of the computer display of FIG. 2a, which includes the provision of additional graphical data regarding an attendee which is provided in accordance with the method and system of the present invention. Computer display 50 within FIG. 2b is identical to that described with respect to FIG. 2a; however, the ability of the method and system of the present invention to provide additional data regarding a prospective attendee, meeting site, or element of equipment is depicted. An additional subwindow 76 is provided and utilized, in the depicted embodiment of FIG. 2b, to provide a graphic representation of one desired attendee as selected by the meeting scheduler.

As described with respect to FIG. 2a, if a graphical pointing device, such as a mouse, is associated with a particular computer within data processing system 8, mouse pointer 60 may be utilized to invoke this additional data by selecting an element of computer display 50 which is associated with a particular attendee, meeting site or element of equipment. As illustrated in FIG. 2b, mouse pointer 60 has been utilized to select a graphically distinctive object 56 associated with attendee "Jennifer Hawthorn." In response to that selection, additional subwindow 76 is displayed including a bit-mapped depiction of an image or video presentation of Jennifer Hawthorn.

Those skilled in the art will appreciate that additional data in the form of audio-visual parameters may be selected by the meeting scheduler in the manner described herein. Specifically, such additional data may include meeting site floor plans or equipment technical specifications and may be invoked by selecting some element of computer display 50 associated with a particular attendee, meeting site or element of equipment either within textual display window 62 or availability window 52. As illustrated, additional subwindow 76 includes various user selectable "buttons" which may be utilized to automatically initiate a telephone dialing program to contact the particular individual or to illicit additional information regarding that individual for meeting scheduling purposes. Upon reference to FIG. 2b, those skilled in the art will appreciate that by permitting the invocation of additional audio or video information regarding a particular attendee, meeting site or element of equipment, the method and system of the present invention greatly enhances the usability of the meeting scheduling system described herein.

Figure 3:
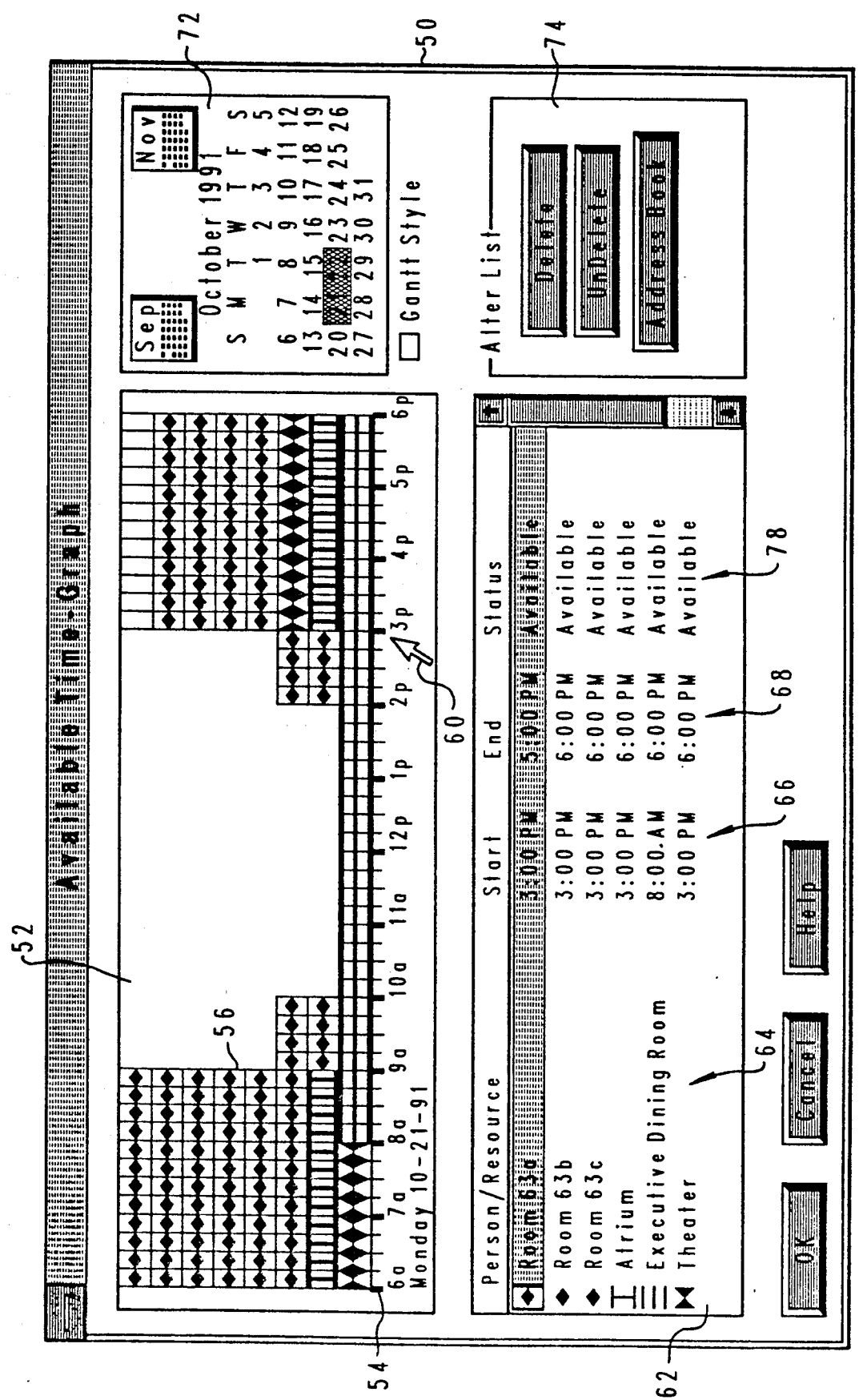
FIG. 3 is a pictorial representation of a computer display providing an intuitive graphic representation of the availability status of a plurality of desired meeting sites in accordance with the method and system of the present invention.

With reference now to FIG. 3, there is depicted a pictorial representation of a computer display providing an intuitive graphic representation of the availability status of a plurality of desired meeting sites in a manner similar to that depicted within FIG. 2. As illustrated within FIG. 2, computer display 50 includes a plurality of subwindows including availability window 52, textual display window 62, "Alter List" window 74 and calendar window 72. As illustrated within FIG. 3, the graphically distinctive objects depicted in multiple tiers perpendicular to time axis 54 are each associated with a particular meeting site. As will be explained in greater detail herein, the method and system of the present invention may be utilized to provide an intuitive graphic representation of the availability of desired meeting attendees, meeting sites or elements of equipment by graphically depicting either "conflicts" with a scheduled meeting or periods of time during which the prospective attendees, sites and elements of equipment are available. In the depicted embodiment within availability window 52, the periods of time during which each meeting site is available is depicted. Thus, it may be seen that each tier of graphically distinctive objects disposed perpendicular to time axis 54 represents a prospective meeting site which is available at that particular time point.

In the manner illustrated within FIG. 2, a mouse pointer 60 may be utilized to invoke textual display window 62 by positioning mouse pointer 60 at the 3:00 p.m. point along time axis 54 and "clicking" the mouse button. The resultant textual display depicted within textual display window 62 includes a graphic representation of the graphically distinctive object associated with each desired meeting site, along with a textual description of that meeting site. In a manner similar to that described with respect to FIG. 2, a start time and end time for the period of availability are also listed within columns 66 and 68. Finally, the status of a particular meeting site is listed within column 78.

"Alter List" window 74 is also provided and, in a manner quite similar to that described with respect to FIG. 2, may be utilized to delete or undelete a particular meeting site from the established list of desired meeting sites set forth by the meeting scheduler. Calendar window 72 is also utilized in a manner identical to that described with respect to FIG. 2, to indicate that multiple days of availability windows are available for perusal by the meeting scheduler.

Figure 4A:
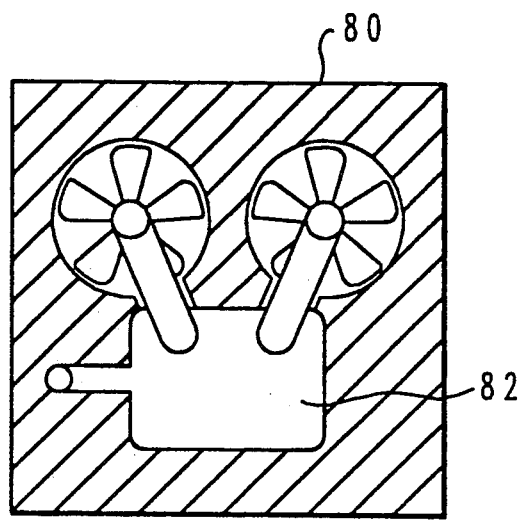
FIGS. 4a and 4b depict pictorial representations of graphically distinctive objects which may be utilized to provide an indication of the availability status of multiple elements of equipment in accordance with the method and system of the present invention.
Figure 4B:
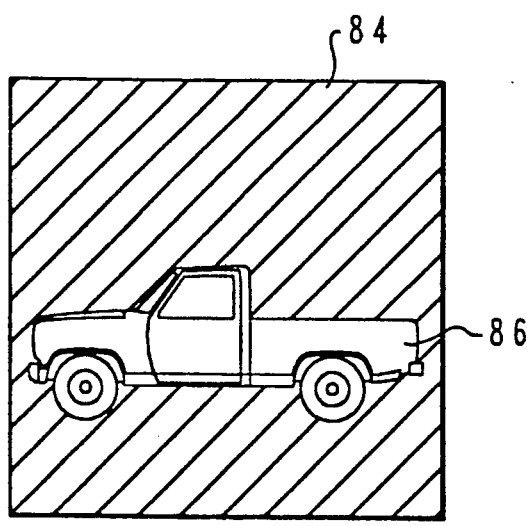

Referring now to FIGS. 4a and 4b, there are depicted pictorial representations of multiple graphically distinctive objects which may be utilized to provide an indication of the availability status of multiple elements of equipment in accordance with the method and system of the present invention. As noted with respect to FIGS. 2 and 3, each graphically distinctive object associated with a particular individual, meeting site, or element of equipment is preferably a rectangle having a graphically distinctive element associated therewith. The graphically distinctive element may include either cross-hatching or color and, in a preferred embodiment of the present invention, may include an additional graphical element indicating the priority for a particular individual, meeting site or element of equipment as depicted at reference numeral 58 within FIG. 2.

As depicted within FIG. 4a, a graphically distinctive rectangle 80 may be provided which includes a graphic representation of a movie projector 82. Thus, when utilized in conjunction with an availability window such as those depicted within FIGS. 2 and 3, graphically distinctive object 80 may provide an intuitive and graphic representation as to the availability of a movie projector for utilization by a meeting scheduler. Similarly, as depicted within FIG. 4b, a graphically distinctive object 84 may be provided which includes a pictorial representation of a truck 86.

In this manner an intuitive and graphic representation of the availability of a truck may be depicted. Thus, the method and system of the present invention may be seen to have application in systems in which the scheduling of selected elements of equipment are desired and in which an intuitive and graphic representation of the availability of that equipment may be provided.

Figure 5:
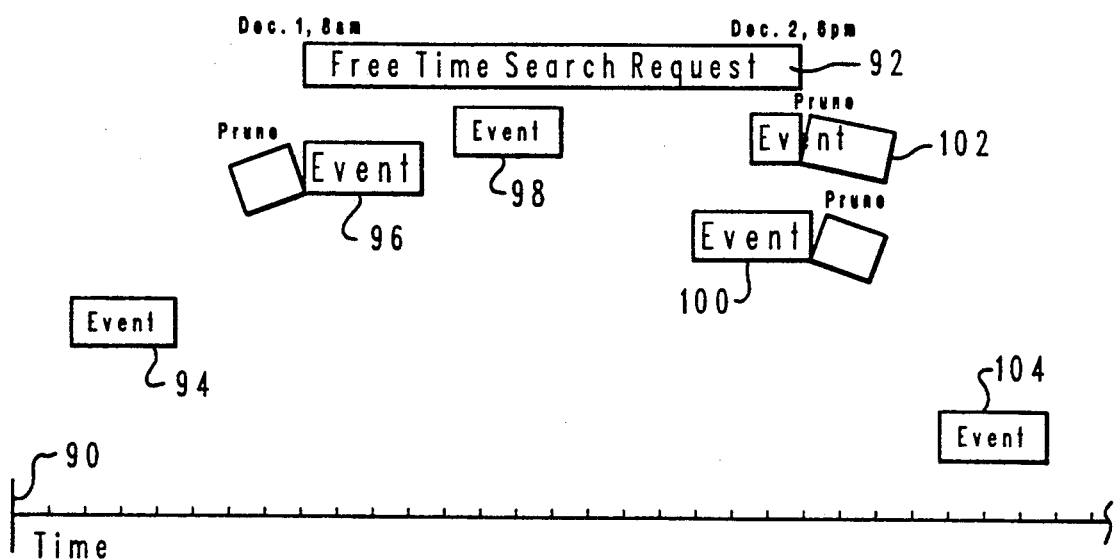
FIG. 5 is a pictorial representation of the "pruning" of stored calendar events to conform to a desired selected time span for meeting in accordance with the method and system of the present invention.

With reference now to FIG. 5, there is depicted a pictorial representation of the "pruning" of stored calendar events to conform to a desired selected time span for a meeting in accordance with the method and system of the present invention. As will be explained in greater detail with respect to FIGS. 7a-7c, a desired time span 90 is determined by a meeting scheduler and all events stored within a calendar database listing scheduled calendar events for all prospective meeting attendees, prospective meeting sites and elements of equipment which may be utilized for a meeting are examined. As illustrated, the meeting scheduler has set forth his or her desire to schedule a meeting in the period beginning December 1 at 8:00 a.m., and terminating December 2 at 6:00 p.m., as indicated at reference numeral 92. Event 94 is first examined and discarded as not occurring within the selected time span.

Next, event 96 is examined; however, as noted, a portion of event 96 occurs prior to the beginning of the selected time span and that portion is therefore pruned, as graphically indicated at reference numeral 96 within FIG. 5. Event 98 is entirely within the selected time span for the requested meeting and is therefore selected for inclusion. Events 100 and 102 fall partially within the selected time span indicated at reference numeral 92 and therefore must be "pruned" in the manner graphically indicated within FIG. 5. Finally, event 104 is depicted; however, since event 104 falls entirely outside of the selected time span for a scheduled meeting it is not included in the process of the present invention.

Figure 6:
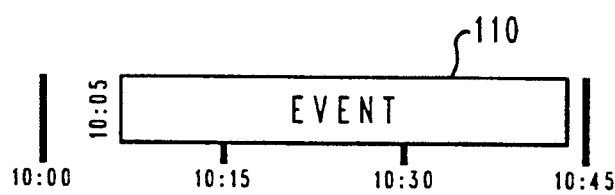
FIG. 6 is a pictorial representation of the "cutting" of stored calendar events into equal time increments for utilization in conjunction with the method and system of the present invention.
Figure 6:
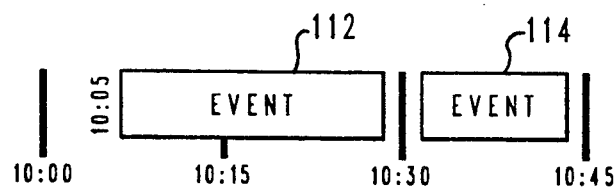
Figure 6:
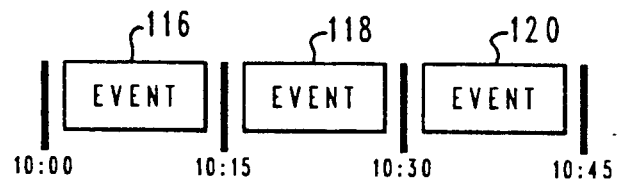

Referring now to FIG. 6, there is depicted a pictorial representation of the "cutting" of stored calendar events into equal time increments for utilization in accordance with the method and system of the present invention. As depicted, an event 110 has been obtained from the calendar database and, as illustrated, event 110 begins at 10:05 and terminates at 10:45. Thereafter, event 110 is depicted as having been cut into events 112 and 114, as a fifteen minute increment of time has been selected by the meeting scheduler as the minimum increment of time to be recognized by the method and system of the present invention.

Thereafter, rounding as necessary, events 112 and 114 are further cut into events 116, 118 and 120, each segment of the original event 110 being cut into an equal time increment in accordance with the method and system of the present invention. In accordance with an important feature of the present invention, the attributes of each event are maintained, even when those events are cut into smaller sections. Such attributes may include a name, description, start time, end time, priority, etc. It should be noted that an event may constitute a scheduled event for any person, site or element of equipment which includes calendar data stored within the calendar database.

Figure 7A:
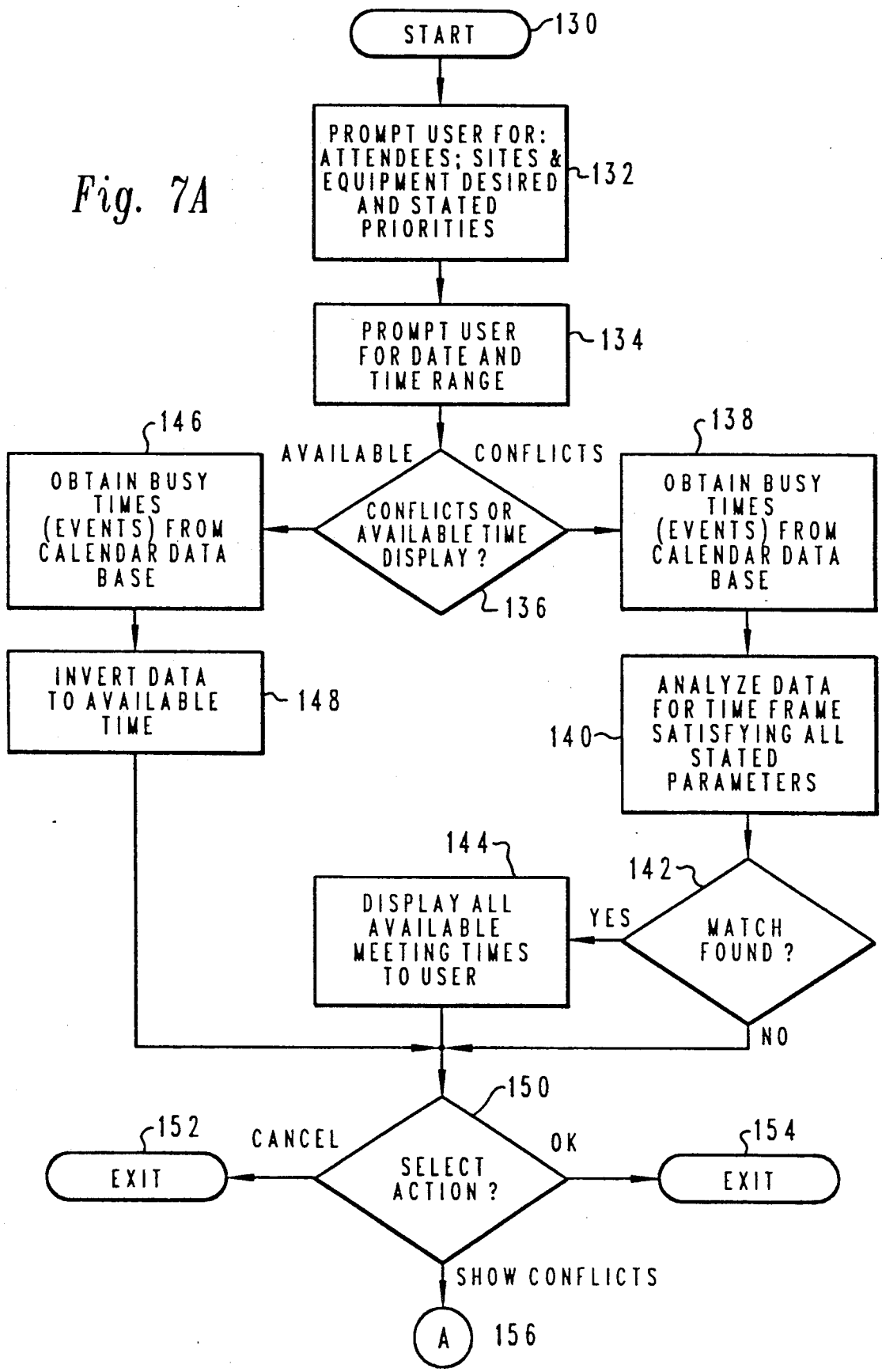
FIGS. 7a–7c, when considered together, form a high level logic flowchart illustrating a software implementation of the method and system of the present invention.
Figure 7B:
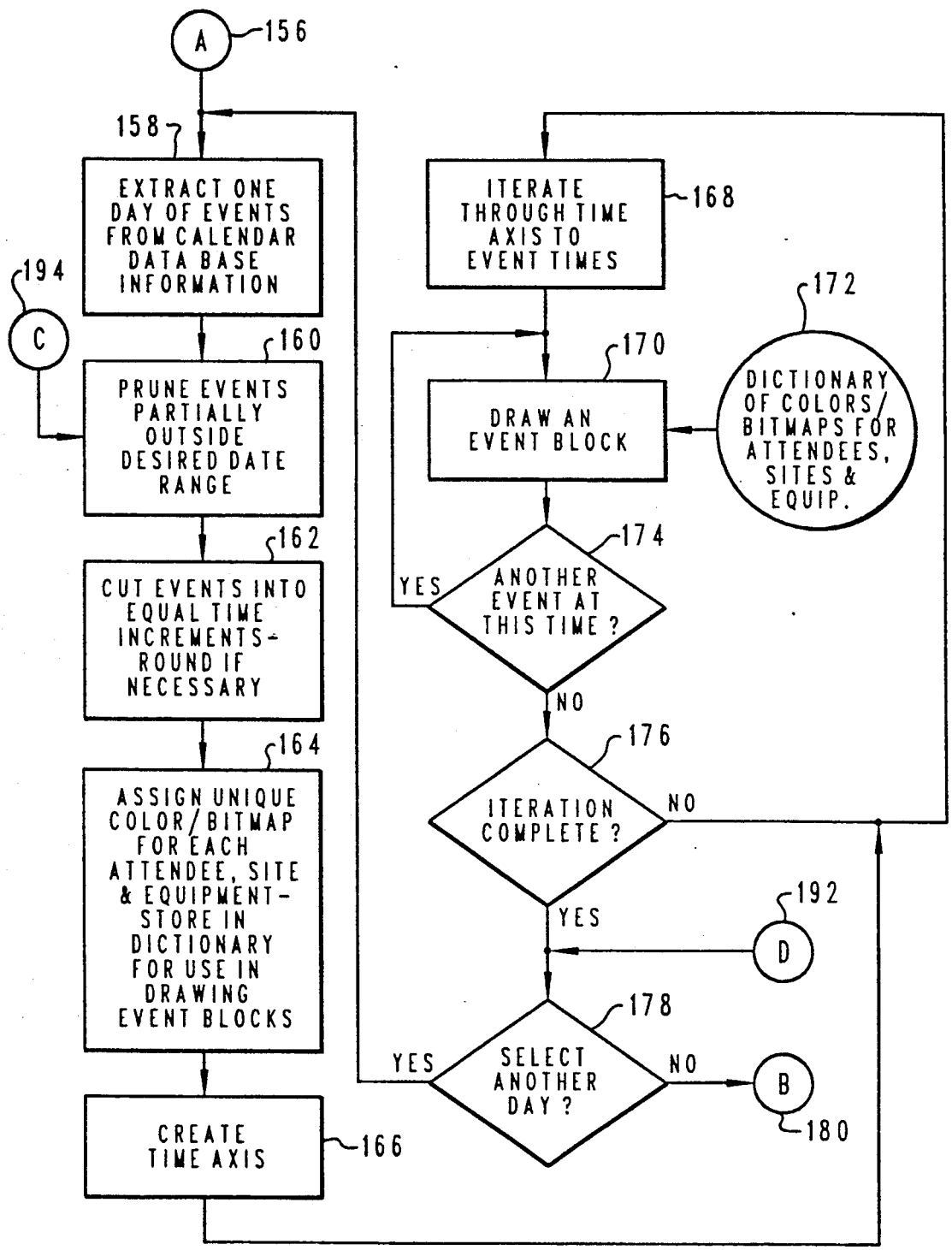
Figure 7C:
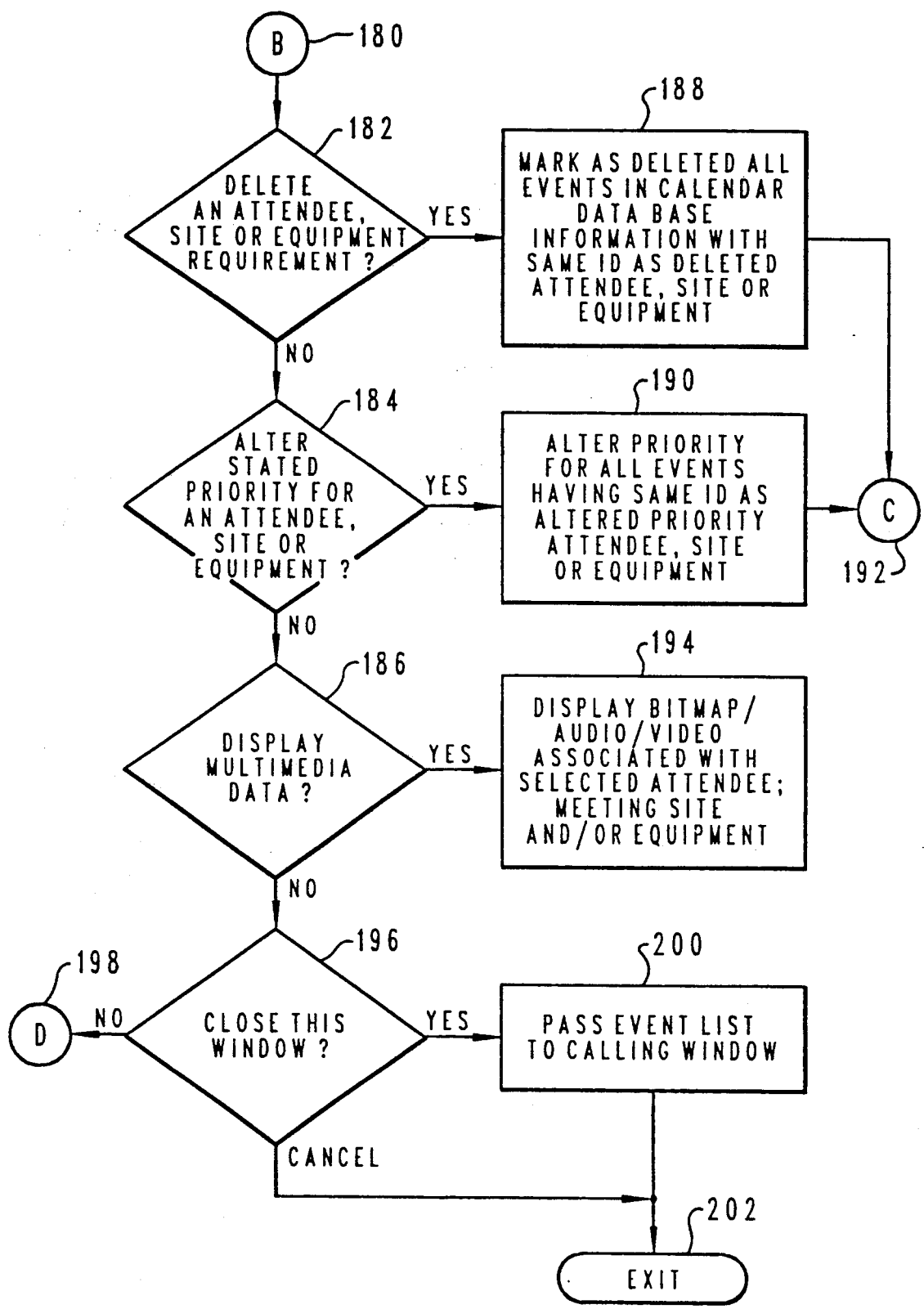

With reference now to FIGS. 7a-7c, there is depicted a high level logic flowchart which illustrates a software implementation of the method and system of the present invention which incorporates those actions depicted within FIGS. 5 and 6. As noted, the process begins at block 130 and thereafter passes to block 132 which illustrates the prompting of the user for desired attendees, sites and equipment for a particular meeting and the stated priorities for each of those persons or resources. Next, the process passes to block 134 which illustrates the prompting of the user to enter a date and time range for the prospective meeting.

Thereafter, in accordance with an important feature of the present invention, block 136 illustrates a determination of whether or not the meeting scheduler desires to display either "conflicts" with existing calendar events or "available time" which exists between existing calendar events. In the event "conflicts" with existing calendar events is chosen, the process passes to block 138. Block 138 illustrates the obtaining of busy times (events) for each attendee, site and element of equipment set forth by the meeting scheduler from the calendar database. Thereafter, the process passes to block 140.

Block 140 illustrates an analysis of the data from the calendar database to locate a time frame which satisfies all stated parameters by the meeting scheduler. Thereafter, as depicted at block 142, a determination is made as to whether or not any time frame exists which matches all stated parameters. If so, the process passes to block 144 which depicts the displaying of all available meeting times to the user for his or her selection.

Referring again to block 136, in the event the user selects a display of "available time," the process passes to block 146. As described with respect to block 138, block 146 illustrates the obtaining of busy times (events) for each desired attendee, site and element of equipment from the calendar database. Thereafter, the process passes to block 148 which illustrates the inversion of that data to create an indication of "available time" for all specified attendees, sites and elements of equipment.

After inverting the event data from the calendar database to create a listing of "available times," or after displaying all available meeting times to the user which meet all stated parameters, or in the event no stated time is found which meets all standard parameters, the process passes to block 150. As depicted within block 150, several options are available to the meeting scheduler. A meeting scheduler may elect to cancel his or her request for a meeting, in which case the process passes to block 152 and terminates. Alternately, the user may elect to select a particular available meeting time set forth and displayed, as depicted at block 144, and the process will then terminate, as depicted at block 152. Alternately, the user may select the showing of "conflicts" for a prospective meeting and the process then passes to block 158, via connector 156.

Referring now to FIG. 7b, the process of depicting all "conflicts" begins at block 158. Block 158 illustrates the extracting of one day of events from the calendar database information previously obtained. Next, the process passes to block 160. Block 160 illustrates the pruning of events partially outside the desired time range as previously described with respect to FIG. 5. Thereafter, the events are cut into equal time increments, rounding if necessary, as depicted at block 162. Block 162 illustrates the process graphically depicted and previously described with respect to FIG. 6.

Next, in accordance with an important feature of the present invention, the process passes to block 164. Block 164 illustrates the assigning of a unique color/bit map for each attendee, site and element of equipment to be utilized in creating a graphically distinctive object which is associated with desired attendees, sites and elements of equipment and the storage of that information in a dictionary described below. Thereafter, the process passes to block 166. Block 166 illustrates the creation of time axis 54 (see FIGS. 2 and 3) and the process then passes to block 168.

Block 168 illustrates multiple iterations through time axis 54 to each event time contained within the calendar database information previously obtained from the calendar database. When an event or period of available time is encountered within the information obtained from the calendar database, the process passes to block 170. Block 170 illustrates the drawing of an event block, that is, a graphically distinctive object associated with a scheduled calendar event for a particular individual, meeting site or element of equipment. This is accomplished utilizing the Dictionary of Colors/Bit Maps for attendees, sites and elements of equipment contained within memory, as indicated at block 172.

After iterating through the time axis to the first event, and drawing an event block, block 164 illustrates a determination of whether or not another event exists at this particular time point along the time axis. Those skilled in the art will appreciate that multiple attendees, meeting sites or elements of equipment may have conflicting calendar events scheduled at a particular time and, as illustrated within availability windows 52 of FIGS. 2 and 3, a tier of graphically distinctive objects may be created perpendicular to time axis 54, each graphically distinctive object representing a scheduled calendar event, or the nonexistence of a scheduled calendar event, for a particular attendee, meeting site or element of equipment. In the event another event exists within the calendar database information for this particular time point along time axis 54, as determined at block 174, the process returns to block 170 to draw a second or subsequent event block.

After no additional events are present at a particular time point along time axis 54, as determined at block 174, the process passes to block 176. Block 176 illustrates a determination of whether or not the iteration through the time axis is complete and if not, the process returns to block 168 to continue iterating through time axis 54 to the various event times obtained from the calendar database information.

Referring again to block 176, in the event the iteration through time axis 54 is complete, the process passes to block 178. Block 178 illustrates a determination of whether or not the selected time span includes a second or subsequent day and if so, the process returns iteratively to block 158 to proceed in the fashion described above. In the event no subsequent day of events is required, as determined at block 178, the process passes to block 182, via connector 180, in the manner graphically indicated at FIG. 7b.

Referring now to FIG. 7c, the process continues at block 182 which illustrates a determination of whether or not the meeting scheduler desires to delete an attendee, site or equipment requirement. If so, the process passes to block 188. Block 188 depicts the marking as "deleted" of all events within the calendar database information which include the same identification as the deleted attendee, meeting site or element of equipment. The process then passes back to block 178, via connector 192, in the manner depicted.

Referring again to block 182, in the event the user does not desire to delete an attendee, meeting site or element of equipment, the process passes to block 184. Block 184 illustrates a determination of whether or not the meeting scheduler desires to alter a stated priority for an attendee, meeting site or element of equipment and if so, the process passes to block 190.

Block 190 illustrates the automatic alteration of the stated priority for all events within the calendar database information which have the same identification as the altered priority attendee, meeting site or element of equipment and, the process then returns to block 178, via connector 192, in the manner graphically depicted.

Referring again to block 184, in the event the meeting scheduler does not desire to alter the stated priority for an attendee, meeting site or element of equipment, the process passes to block 186. Block 186 illustrates a determination of whether or not the user desires to display additional multimedia data associated with a particular attendee, meeting site and/or equipment in the manner described above with respect to FIG. 2b. If so, the process passes to block 194 which illustrates the displaying of the additional bitmap, audio or video data associated with a selected attendee, meeting site and/or equipment. Those skilled in the art will appreciate that this may constitute any manner of audio/visual information and may include, in addition to photographs of the type depicted within FIG. 2b, floor plans for a particular meeting site or technical specifications for a particular element of equipment.

Referring again to block 186, in the event the user does not desire to display additional multimedia data, the process passes to block 196. Block 196 illustrates a determination of whether or not the user desires to close the window illustrating the graphic representation of the availability of the desired attendees, meeting sites and/or elements of equipment and if not, the process returns to block 160, via connector 198, in the manner graphically depicted. In the event the user does desire to close the window, the process passes to block 200, which illustrates the passing of the event list to the calling window and the process then terminates, as depicted at block 202. Referring again to block 196, in the event the user cancels the command to close the window, the process again passes to block 202 and terminates.

Upon reference to the foregoing those skilled in the art will appreciate that the Applicants herein have provided a novel intuitive and graphic representation which may be utilized to determine the availability of desired attendees, meeting sites and/or elements of equipment in a computer based scheduling system. By providing such a graphic interface, a user may quickly and efficiently determine the optimal meeting schedule which most completely complies with his or her stated objectives without having to rely upon automatic optimization programs which may or may not meet the meeting scheduler's priorities.

While the invention has been particularly shown and described with reference to a preferred embodiment, it will be understood by those skilled in the art that various changes in form and detail may be made therein without departing from the spirit and scope of the invention.

We claim:

1. A method in a data processing system having a display, a graphical pointing device and a calendar database listing scheduled calendar events for a plurality of prospective meeting attendees, of providing an intuitive graphic representation of the availability of desired attendees within a selected time span, said method comprising the steps of:

establishing a listing of desired meeting attendees;
   associating a different graphically distinctive object with each listed desired meeting attendees;
   utilizing said calendar database to determine an existence of scheduled calendar events for each listed desired meeting attendee within said selected time span;
   displaying at least a portion of said selected time span as a plurality of time points along a first axis;
   displaying, perpendicular to said first axis at selected time points thereon, a tier of graphically distinctive objects associated with selected ones of said listed desired meeting attendees at each point along said first axis corresponding to an existence of a scheduled calendar event for each of said selected ones of said list of desired meeting attendees; and
   displaying a textual description of selected calendar events at a selected time point in response to a graphic selection of said selected time point utilizing said graphical pointing device.

2. The method of providing an intuitive graphic representation of the availability of desired attendees within a selected time span according to claim 1, wherein said calendar database lists scheduled calendar events for a plurality of meeting sites and wherein said step of establishing a listing of desired meeting attendees includes the step of establishing a listing of desired meeting sites.

3. The method of providing an intuitive graphic representation of the availability of desired attendees within a selected time span according to claim 2, further including the step of associating a graphically distinctive object with each listed desired meeting site.

4. The method of providing an intuitive graphic representation of the availability of desired attendees within a selected time span according to claim 3, wherein said step of displaying, perpendicular to said first axis at selected time points thereon, a tier of at least one of said graphically distinctive objects associated with selected ones of said listed desired meeting attendees comprises the step of displaying, perpendicular to said first axis at selected time points thereon, a tier of at least one of said graphically distinctive objects associated with selected ones of said listed desired meeting attendees and said listed desired meeting sites in response to an existence of scheduled calendar events within said portion of said selected time span for each of said selected ones of said listed desired meeting attendees and desired meeting sites.

5. A data processing system having a display, a graphical pointing device and a calendar database listing scheduled calendar events for a plurality of prospective meeting attendees for providing an intuitive graphic representation of the availability of desired meeting attendees within a selected time span, said data processing system comprising:

means for establishing a listing of desired meeting attendees;
   means for associating a different graphically distinctive object with each of said listed desired meeting attendees;
   means for utilizing said calendar database to determine an existence of scheduled calendar events for each listed desired meeting attendees within said selected time span;
   means for displaying at least a portion of said selected time span as a plurality of time points along a first axis;
   means for displaying, perpendicular to said first axis at selected time points thereon, a tier of graphically distinctive objects associated with selected ones of said listed desired meeting attendees in response to an existence of a selected calendar event within said portion of said selected time span for each of said selected ones of said listed desired meeting attendees; and means for displaying a textural description of selected calendar events at a selected time point in response to a graphic selection of said selected time point utilizing said graphical pointing device.

6. The data processing system for providing an intuitive graphic representation of the availability of desired meeting attendees within a selected time span according to claim 5, wherein said means for displaying at least a portion of said selected time span is a plurality of time points along a first axis comprises means for displaying at least a portion of said selected time span as a plurality of time points along a first horizontal axis.

7. The data processing system for providing an intuitive graphic representation of the availability of desired meeting attendees within a selected time span according to claim 5, wherein each of said graphically distinctive objects associated with each listed desired meeting attendee comprises a graphically distinctive rectangle.

8. The data processing system for providing an intuitive graphic representation of the availability of desired meeting attendees within a selected time span according to claim 7, wherein said data processing system display comprises a color display and wherein each of said graphically distinctive rectangles associated with each listed desired meeting attendee comprises a different color rectangle.

9. The data processing system for providing an intuitive graphic representation of the availability of desired meeting attendees within a selected time span according to claim 5, wherein said calendar database list scheduled calendar events for a plurality of meeting sites and wherein said means for establishing a listing of desired meeting attendees includes means for establishing a listing of desired meeting sites.

10. The data processing system for providing an intuitive graphic representation of the availability of desired meeting attendees within a selected time span according to claim 9, wherein said means for associating a graphically distinctive object with each listed desired meeting attendee further includes means for associating a graphically distinctive object with each listed desired meeting site.

11. The data processing system for providing an intuitive graphic representation of the availability of desired meeting attendees within a selected time span according to claim 10, wherein said means for displaying, perpendicular to said first axis at selected time points thereon, a tier of at least one of said graphically distinctive objects associated with selected ones of said listed desired meeting attendees comprises means for displaying, perpendicular to said first axis at selected time points thereon, a tier of at least one of said graphically distinctive objects associated with selected ones of said listed desired meeting attendees and said listed desired meeting sites in response to an existence of scheduled calendar events within said portion of said selected time span for each of said selected ones of said listed desired meeting attendees and desired meeting sites.

12. The data processing system for providing an intuitive graphic representation of the availability of desired meeting attendees within a selected time span according to claim 5, wherein said calendar database list scheduled calendar events for selected equipment and wherein said means for establishing a listing of desired meeting attendees includes means for establishing a listing of desired equipment.

13. The data processing system for providing an intuitive graphic representation of the availability of desired meeting attendees within a selected time span according to claim 12, wherein said means for associating a graphically distinctive object with each listed desired meeting attendee further includes means for associating a graphically distinctive object with each listed desired equipment.

14. The data processing system for providing an intuitive graphic representation of the availability of desired meeting attendees within a selected time span according to claim 13, wherein each graphically distinctive object associated with each listed desired equipment comprises a rectangle including a graphic depiction of said desired equipment.

* * * * *